United States Patent [19]
Trumbore et al.

[11] Patent Number: 4,595,443
[45] Date of Patent: Jun. 17, 1986

[54] POLLUTION-REDUCING METHOD OF INCORPORATING DUST SUPPRESSANT IN FIBROUS INSULATION MATERIAL

[75] Inventors: David C. Trumbore, Newark; William A. Kays, Columbus, both of Ohio

[73] Assignee: Owens-Corning Fiberglas Corporation, Toledo, Ohio

[21] Appl. No.: 729,092

[22] Filed: May 2, 1985

Related U.S. Application Data

[63] Continuation of Ser. No. 521,482, Aug. 8, 1983, abandoned.

[51] Int. Cl.⁴ .................. C03B 32/00; C03C 25/02
[52] U.S. Cl. ........................... 156/296; 65/4.4; 264/12
[58] Field of Search ............... 65/4.4, 6, 14, 5, 7, 65/18.3; 156/62.4, 167, 296; 264/14, 12

[56] References Cited

U.S. PATENT DOCUMENTS

| 2,707,690 | 5/1955 | Pearson | 65/4.4 |
| 2,931,422 | 4/1960 | Long | 65/4.4 |
| 3,337,669 | 8/1967 | Shannon et al. | 65/4.4 |
| 3,877,911 | 4/1975 | Borst | 65/6 |
| 3,902,878 | 9/1975 | Hoag, Jr. et al. | 65/6 |

Primary Examiner—Michael Ball
Attorney, Agent, or Firm—Ronald C. Hudgens; Ted C. Gillespie; Paul J. Rose

[57] ABSTRACT

In making entangled fibrous products by depositing fibers from streams of hot gas in which they are entrained, dust suppressant incorporated in the product by introducing at least a portion of it into the cooler region surrounding and separating the fiber-entraining streams of hot gas and communicating with the zone wherein the fibers are deposited minimizes smoke evolution as compared to introducing such portion into the hot gas streams.

7 Claims, 2 Drawing Figures

POLLUTION-REDUCING METHOD OF INCORPORATING DUST SUPPRESSANT IN FIBROUS INSULATION MATERIAL

This is a continuation of application Ser. No. 521,482, filed on Aug. 8, 1983, now abandoned.

FIELD OF THE INVENTION

This invention relates to the field of products comprised of randomly entangled fibers, such as fibrous glass wool or board thermal insulating material, acoustical panels and the like, and more particularly to processes for making such products which involve depositing the fibers from streams of gas in which they have been entrained.

BACKGROUND OF THE INVENTION

Fibrous glass wool or board insulating materials and acoustic panels, and similar products fabricated from fibers of other composition, such as mineral or basalt fibers, are typically produced by deposition of the fibers from entrainment in at least one stream of gas as those gas streams pass into a fiber deposition zone, which ordinarily is bounded from below by a porous support moving along the base of a region surrounding and separating the fiber-entraining gas streams which pass through it toward the porous support, the transverse boundaries of this region ordinarily being defined by a pair of generally vertical walls. Typically the fibers are produced by the expression of streams of liquid, e.g. molten, fiber-forming material such as glass through orifices in a suitable container supplied with the liquid fiber-forming material, as by centrifugal expression from a generally bowl-shaped container having suitable perforations in its sidewalls into a generally axial stream of gas, usually a confluence of hot gas flowing from a generally axially directed gas burner jet augmented with air supplied from a blower, for attenuating the emerging streams of liquid fiber-forming material and entraining the fibers so formed. Ordinarily the fiber attenuating and entraining gas streams will be comprised of hot gas and will pass through a region of substantially cooler gas into the fiber deposition zone.

A resinous binder is frequently incorporated in the fibrous product, typically by spraying a solution or emulsion thereof or of a precursor thereof, into the fiber-entraining streams of hot gas wherein the solvent or dispersing medium is volatilized and the binder or its precursor is deposited onto the fibers and carried by them into the mass of entangled fibers as it forms in the deposition zone. Thereafter the binder or its precursor may be cured or otherwise reacted by exposing the entangled fibrous mass to heat, radiation, etc., and the entangled fibrous material may be trimmed, slit and/or cut to desired dimensions and may be laminated to other substrates and/or facings.

Such binder compositions frequently also contain a dust suppressant such as petroleum brightstock or tempering oil to suppress the evolution of dust from the product, primarily during handling and installation. However, such dust suppressants are found to contribute to pollution of the effluent gas from the deposition zone and of the surrounding workplace, and also of the effluent and surroundings of any downstream oven in which the fibrous mass may be heated to cure the binder therein, as evidenced by reduced light transmittance indicating increased smoke generation as the amount of such dust suppressant applied as part of the binder composition is increased. Such a process, and suitable apparatus therefor, is described in detail in U.S. Pat. No. 3,523,774 of Aug. 11, 1970 entitled Rotary Apparatus for Forming Glass Fibers, incorporated herewith by reference.

The present invention reduces such increased smoke evolution, at least in the fiber entrainment and deposition stages, by providing a method for incorporating at least a portion of the dust suppressant otherwise than by introducing it into the hot gas streams in which the fibers are entrained prior to their deposition. This method also reduces the waste of dust suppressant by reducing the amount converted to smoke.

SUMMARY OF THE INVENTION

The invention is an improvement in a process for making a fibrous product which comprises (A) directing a plurality of streams of hot gas in which fibers are entrained through a surrounding region of substantially cooler gas into a deposition zone wherein the entrained fibers are deposited to form a more-or-less randomly entangled fibrous mass, said region of cooler gas communicating with said deposition zone, and (B) incorporating dust suppressant in said fibrous product. The improvement comprises introducing at least a portion of the dust suppressant, or a precursor thereof, into said cooler surrounding region so that said portion of dust suppressant or precursor is deposited in said fibrous mass in said deposition zone substantially without entrainment in said streams of hot gas.

DETAILED DESCRIPTION

Figure 1:
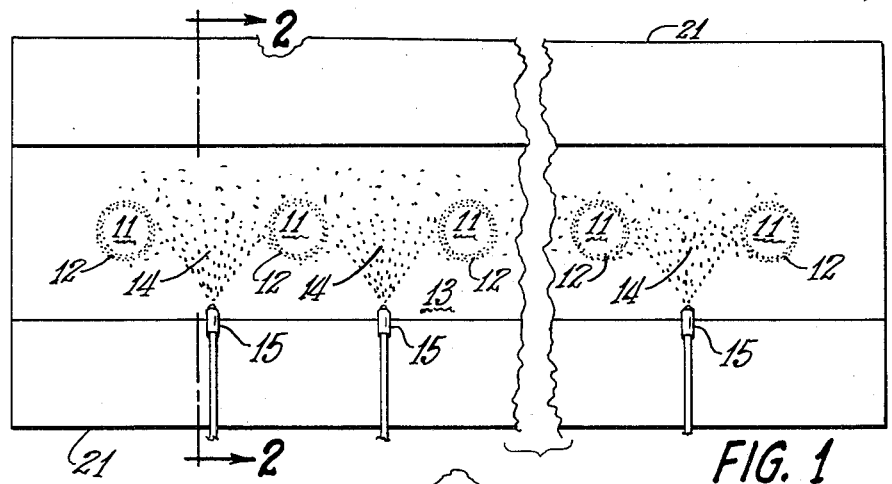
FIG. 1 shows in plan view the hot gas streams 11 entraining fibers 12 surrounded and separated by cooler region 13, transversly delimited by walls 21, into which region 13 droplets 14 comprising dust suppressant are introduced through spray nozzles 15.
Figure 2:
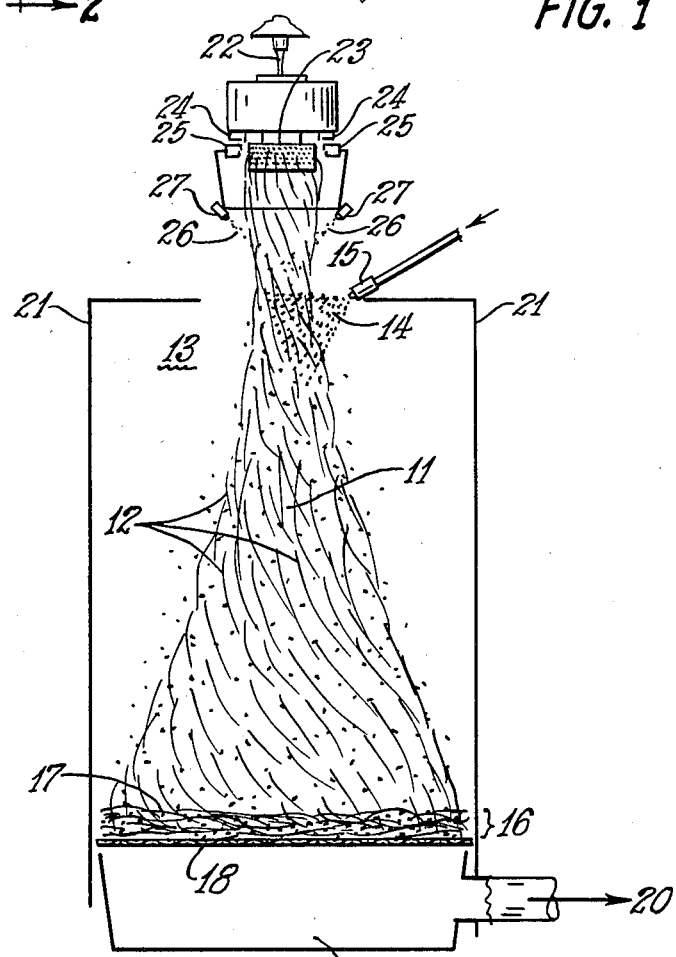
FIG. 2 is a view along the direction indicated by arrows 2—2 of FIG. 1 showing a hot gas stream 11 entraining fibers 12 and downwardly directed through the cooler surrounding and separating region 13 to deposition zone 16 wherein the fibers 12 are deposited to form randomly entangled fibrous mass 17 on porous support 18 through which gas passes into chamber 19 for exhaustion 20. The fibers are produced from liquid (e.g. molten) fiber-forming material 22 by centrifugal expression thereof through perforated sidewalls of rotating bowl 23 followed by attenuation and entrainment thereof by the downwardly directed streams of hot gas 11 produced by confluence of hot gas emerging from burner jets 24 and supplemental air emerging from blower outlets 25. Droplets 26 of binder composition can be introduced into the fiber-entraining hot gas streams 11 through binder spray nozzles 27 and droplets 14 containing dust suppressant are introduced into the cooler surrounding region 13 through spray nozzles 15.

The fibers and the streams of hot gas entraining them in conjunction with which the method of the present invention is used can be formed of any suitable materials by any convenient process, but a principal and preferred application of the invention is in the production of glass fiber thermal insulation material wherein the fibers are produced by centrifugal expression of streams of molten glass from perforations in the sidewalls of bowl-shaped containers spinning about generally vertical axes, which expressed streams are attenuated and entrained by generally downwardly directed jets of hot gas from gas burners mounted above and more-or-less circumferentially surrounding the spinning bowl-shaped containers. The hot gas streams from the burners are usually supplemented with air supplied by blowers, but the combined stream of gas ordinarily remains hot, typically about 500° F., whereas the region surrounding the fiber-entraining streams is ordinarily substantially cooler, typically about 130° F. Usually a row of several such fiber entraining streams of hot gas will be produced and directed downwardly toward a single porous support moving horizontally at the base of a pair of generally vertical sidewalls so that the fibers from the several streams deposit sequentially on the porous support to build up the desired thickness of entangled fibers thereon. Ordinarily a resinous binder composition, which may contain dust suppressant, is sprayed into the fiber-entraining streams of hot gas through a number of nozzles surrounding each such stream just below the spinner bowl. This binder composition is typically an aqueous emulsion of a phenol-urea-formaldehyde resin and is typically introduced at a rate adjusted to incorporate about 4 to about 5 percent by weight of non-volatile components in the entangled fibrous product, of which typically about 0.3 to about 0.4 percent by weight is dust suppressant such as petroleum brightstock or tempering oil.

The present invention lies in introducing at least a portion of the dust suppressant, or precursor thereof, particularly where more than about 0.3 to 0.4% is to be incorporated into the entangled fibrous product, into the cooler region surrounding and separating the fiber-entraining streams of hot gas and communicating with the deposition zone, by spraying or any other suitable and convenient means. The air in this region is ordinarily somewhat turbulent with net flow generally toward the deposition zone where it is exhausted together with the gas from the fiber-entraining hot gas streams through the porous support after passing through the forming mass of entangled fibers deposited thereon. Thus, the dust suppressant introduced into this region will be carried into the deposition zone and deposited into the fibrous mass as it is being formed. However, some adjustment of the spray velocity, direction and pattern may be advantageous in order to control uniformity of deposition in the product as well as to minimize the loss of material through deposition on the confining sidewalls and/or its entrainment in the hot gas streams where it may contribute to evolution of increased amounts of smoke. It has been found that spraying the dust suppressant composition as fine droplets, preferably having mean diameter not greater than about 100 microns and more preferably not greater than about 50 microns, is particularly advantageous.

The dust suppressant can be any suitable material, including a precursor which may not itself be effective but which is subsequently transformed into an effective dust suppressant in situ. If part of the dust suppressant is incorporated in a binder composition, that part may be the same or a different material from that introduced into the cooler region. Petroleum brightstock or tempering oils are suitable and effective dust suppressants. The dust suppressant, and particularly such petroleum brightstock or tempering oil, is advantageously introduced as an aqueous emulsion. We have found a particularly suitable composition to consist of 100 parts by weight of Shell 150 tempering oil emulsified with 3.5 parts by weight of Igepal CO-530 in about 100 parts by weight of water. Shell 150 is a straight petroleum tempering oil having a flash point of at least about 580° F. Igeal CO-530 (TM/GAF) is an ethoxylated p-nonyl-phenol non-ionic surfactant having an HLB index of about 10.

Glass fiber wool thermal insulating material bonded with about 4 to 5 percent by weight of a conventional phenol-urea-formaldehyde thermally post-cured binder resin and which contined about 0.3 to 0.4 percent by weight of petroleum tempering oil introduced as part of the aqueous binder composition into the fiber-entraining hot gas streams and, additionally, about 0.5 to 0.6 percent by weight of tempering oil introduced as a 50% aqueous emulsion into the cooler region surrounding and separating the fiber-entraining gas streams and deposited more-or-less uniformly throughout the product, was found to provide enhanced control of dust evolution from the product, as compared to omitting the additional oil, with substantially less increase in smoke emission, compared to including the additional oil in the binder composition.

Numerous variations and modifications of the invention will be apparent to those skilled in the art and are intended to be comprehended by the present description and claims.

We claim:

1. In a process for making a fibrous product which comprises directing a plurality of steams, arranged in a row, of hot gas in which fibers and a binder, optionally mixed with a dust suppressant, are entrained, through a surrounding region of substantially cooler gas into a deposition zone wherein the entrained fibers are deposited to form a more-or-less randomly entangled fibrous mass, said region of cooler gas communicating with said deposition zone, the improvement comprising introducing dust suppressant, or a precursor thereof, into said surrounding region of cooler gas at a plurality of points arranged in a row parallel to and horizontally offset from said row of hot gas streams and respectively disposed between streams of pairs of adjacent hot gas streams, whereby said last mentioned dust suppressant or precursor is deposited in said fibrous mass in said deposition zone substantially without entrainment in said streams of hot gas.

2. An improved process according to claim 1 wherein said dust suppressant or precursor introduced into said surrounding region of cooler gas is sprayed thereinto.

3. An improved process according to claim 1 wherein said fibers are glass fibers.

4. An improved process according to claim 1 wherein said dust suppressant introduced into said surrounding region of cooler gas comprises petroleum brightstock or tempering oil.

5. An improved process according to claim 4 wherein said dust suppressant introduced into said surrounding region of cooler gas is sprayed thereinto as an emulsion in aqueous medium.

6. An improved process according to claim 5 wherein said emulsion is sprayed as droplets having mean initial diameter not greater than about 100 microns.

7. An improved process according to claim 6 wherein said fibers are glass fibers.

* * * * *